No. 894,183. PATENTED JULY 28, 1908.
J. A. BRODIN.
PIPE JOINT.
APPLICATION FILED AUG. 17, 1907.
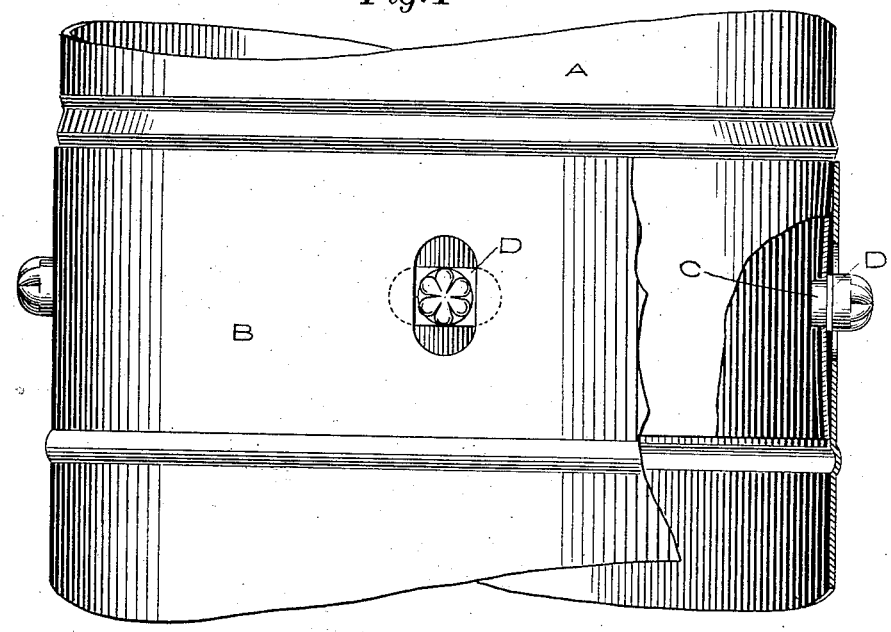
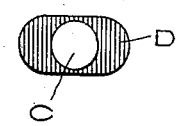
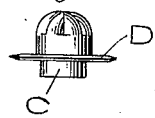
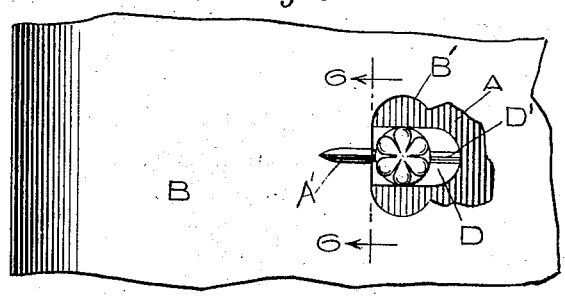
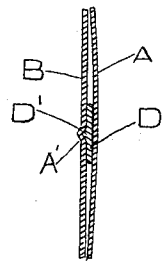
WITNESSES: John M Culver, Sophie B. Werner.
INVENTOR John A. Brodin by Parker & Carter attys.

UNITED STATES PATENT OFFICE.

JOHN A. BRODIN, OF CHICAGO, ILLINOIS.

PIPE-JOINT.

No. 894,183.　　　Specification of Letters Patent.　　　Patented July 28, 1908.

Application filed August 17, 1907. Serial No. 388,970.

*To all whom it may concern:*

Be it known that I, JOHN A. BRODIN, a citizen of the United States, residing at Chicago, in the county of Cook and State of Illinois, have invented a certain new and useful Improvement in Pipe-Joints, of which the following is a specification.

This invention relates to joints for pipes and has for its object to provide a new and improved device of this description.

The invention is illustrated in the accompanying drawings, wherein

Figure 1 is a view showing a stove pipe joint embodying the invention; Fig. 2 is a view showing a side elevation of the connecting or locking piece which holds the two sections of the pipe together; Figs. 3 and 4 are views of the two opposite sides of the device of Fig. 2; Fig. 5 is a view showing a modified construction; Fig. 6 is a sectional view taken on line 6—6 of Fig. 5.

In the drawings the invention is illustrated as used in connection with two sections, A and B, of sheet iron pipe such as the ordinary stove pipe. The end of one section is slid within the end of the other section, as shown, and the connecting or locking piece is placed in position, the two sections of pipe being provided with openings for this purpose.

The connecting or locking piece consists of the part C which passes through both sections of the pipe and the part D which passes between the two sections of the pipe. These parts may be of any desired shape and size, the part D preferably being thin, as shown.

One section of the pipe, say for example, the section B, is provided with an opening $B^1$ which is preferably an elongated opening shaped like the part D. The other section is provided with an opening which may be simply large enough to permit the part C to enter, as shown in Fig. 1. In connecting the two sections together they are placed in the position shown in Fig. 1 and the connecting or locking part placed in position so that the part C will enter the opening in both pipes, while the part D will pass through the opening $B^1$. The locking device is then given a half turn so that it takes the position shown in Fig. 1. The parts are then locked in position and cannot be separated until the locking or connecting piece is rotated to the proper position and removed. Some suitable means may be provided to prevent the connecting or locking piece from being accidentally rotated so as to prevent the accidental separation of the sections of the pipe. Any suitable arrangement for this purpose may be used. One of the pipe sections and the part D may be provided with interlocking parts which engage when the connecting or locking device is in its locking position.

As shown in Figs. 5 and 6, the section B is provided with an indentation or groove $A^1$, while the part D is provided with a projection $D^1$ which fits into this indentation or groove $A^1$ when the device is in its locking position. The interlocking parts can, however, be readily separated by taking hold of the part C and rotating it.

It will be seen that in connecting the two sections together the ends are arranged so as to overlap and the openings therein arranged to register. The connecting or locking device is then passed through the opening, the elongated part D being passed only through the opening $B^1$. The locking device is then partially rotated and the ends of the elongated part then pass between the two sections and engage both of said sections to prevent the withdrawal of the connecting or locking device.

I claim:

1. A pipe joint comprising two pipe sections with overlapping ends, provided with dissimilar but substantially registering openings, a rotatable connecting piece which passes through both of such openings and has a part adapted to be passed, when it is rotated, between the sections.

2. A pipe joint comprising two pipe sections with their ends overlapping, a connecting piece having a part which engages both of said sections, another part which passes between the sections, and interlocking devices, one on said latter part and one on one of said sections which hold the connecting piece in position.

3. A pipe joint comprising two pipe sections with their ends overlapping, each provided with an opening, a connecting device for connecting the sections together consisting of a stem adapted to be rotated and intermediate its ends a part differing in cross sectional area from the stem, the stem adapted to pass into the openings of the two sections and the intermediate part adapted to pass between the overlapping ends of the sections when rotated from the position of insertion.

4. A pipe joint comprising two pipe sections with their ends overlapping, each section provided with an opening, said openings adapted to register when the sections are in their locking position, the opening in one section being elongated, a connecting device adapted to fit into said openings and provided with an elongated part which is adapted to pass through the elongated opening in one section, the parts arranged so that when said elongated piece is passed through such elongated opening it may be partially turned so that the ends thereof pass between the two sections and engage both of them to prevent the removal of the connecting device.

JOHN A. BRODIN.

Witnesses:
SOPHIE B. WERNER,
ABBIE E. JOHNSON.